United States Patent [19]
Badger

[11] 3,793,086
[45] Feb. 19, 1974

[54] METHOD OF CONSTRUCTING A BATTERY CONNECTOR

[76] Inventor: John P. Badger, 2530 Smith Dr., Genoa, Ohio 43430

[22] Filed: Apr. 13, 1972

[21] Appl. No.: 243,598

[52] U.S. Cl. ............................................ 136/134 R
[51] Int. Cl. ............................................ H01m 35/32
[58] Field of Search........ 136/134 R, 176, 135, 133; 219/78, 86, 107; 29/628; 174/84

[56] References Cited
UNITED STATES PATENTS

| | | | |
|---|---|---|---|
| 2,583,575 | 1/1952 | Katz.................................. | 219/86 X |
| 2,889,393 | 6/1959 | Berger .................................. | 174/84 |
| 3,313,658 | 4/1967 | Sabatino et al. .................. | 136/134 R |
| 3,364,076 | 1/1968 | Buttke et al. ...................... | 136/134 R |
| 3,388,005 | 6/1968 | Hahn et al. .......................... | 136/134 |
| 3,723,699 | 3/1973 | Allen ................................. | 219/78 |

FOREIGN PATENTS OR APPLICATIONS

| | | | |
|---|---|---|---|
| 873,522 | 6/1971 | Canada.......................... | 136/134 R |

*Primary Examiner*—Anthony Skapars
*Attorney, Agent, or Firm*—Robert H. Johnson; D. Henry Stoltenberg; Vincent L. Barker, Jr.

[57] ABSTRACT

A method is disclosed for producing through-the-partition battery intercell electrical connections. Flat surfaced connector lugs are placed on each side of a battery partition wall, adjacent an aperture. The connector lugs are each cold formed by a pair of opposed electrodes under the application of high shear force sufficient to extrude the lugs into the aperture until they meet. The high initial shear force on the electrodes then is reduced to a lower secondary shear force, and an electrical welding current is then applied. The welding current is increased as the metal-to-metal contact of the opposed connector lugs increases until the welded connector lugs fills the aperture with metal. The welding current then ceases and the welded connector lugs are allowed to cool while still under the lower secondary shear force. The electrodes are removed from connection and the battery casing, containing liquid-tight intercell battery connections, is ready for further manufacturing or assembling steps.

5 Claims, 6 Drawing Figures

3,793,086

METHOD OF CONSTRUCTING A BATTERY CONNECTOR

BACKGROUND OF THE INVENTION

This invention relates to a method for producing battery intercell electrical connections, commonly referred to as "through-the-partition" battery connections.

Electrical storage batteries are made up of a number of cells. Each cell consists of a plurality of positive plates and a plurality of negative plates. The individual cells are separated from adjacent cells by partition walls. The negative plates of each cell must be connected to the positive plates of each adjacent cell by lead links or connectors. Connecting the cells through the partition walls has been recognized as being advantageous over the earlier method of using over-the-partition connectors. Some advantages noted are: a reduction in the amount of material required, lower internal resistance whereby increased power output may be produced without increasing the battery size, and a reduction of corrosion problems.

DESCRIPTION OF THE PRIOR ART

Generally, through-the-partition battery connectors are made by placing connector lugs having a projecting face adjacent an aperture or hole in the partition walls, aligning the connector lugs by inserting the projections into the aperture, and squeezing and welding the projections. The projections are designed so that the total volume of the projections is greater than the volume of the wall apertures. This excess volume of the projection is stated to result in a good mechanical and fluid-tight seal. For example, U.S. Pat. Nos. to Sabatino 3,313,658; Hahn et al. 3,388,005; Miller 3,336,164; Buttke et al. 3,364,076; Frischkorn 3,275,793 and Barnes et al. 3,515,597 all disclose the use of precast connector projections extending into the partition wall aperture. A major difficulty with this approach arises in attempting to automate the above-described manufacturing process. Because of the speed involved in automated processes, if the projection is not correctly aligned within the partition aperture, the partition may be fractured when the connectors are squeezed together or the aperture not properly filled with fused lead, thus resulting in an imperfect electrical connection of a leaky seal.

Canadian Patent 873,522 to Matter et al, discloses an extrusion-fusion technique which eliminates the use of preformed lug projections. However, Matter uses a pair of opposing hold-down sleeves which clamp the lugs into sealing engagement with the partition wall aperture. The use of clamping means unnecessarily complicates the automated production process.

SUMMARY OF THE INVENTION

The instant invention is based upon the discovery of an improved method of producing through-the-wall battery intercell electrical connections. Opposed conductive connector elements with flat faces are placed adjacent a partition wall aperture. The connector elements are cold-forged or cold-extruded under an initial high shear force between two movable electrodes which force portions of the connector lugs into the partition wall aperture to provide metal-to-metal contact of the opposed lugs. The shear force is then reduced and a welding current applied to the connector elements. Flow of the welding current is stopped and the welded metal is allowed to cool while still under the reduced shear force. After cooling, the movable electrodes are removed and the connection is complete.

It is, therefore, a primary object of the instant invention to provide a method of forming battery through-the-partition intercell electrical connections.

Another object of the instant invention is to provide a method of forming battery intercell connections from flat-surfaced connector lugs.

Other objections and advantages will be apparent to those skilled in the art from the following description of a preferred embodiment.

DESCRIPTION OF A PREFERRED EMBODIMENT

Figures 1, 2:
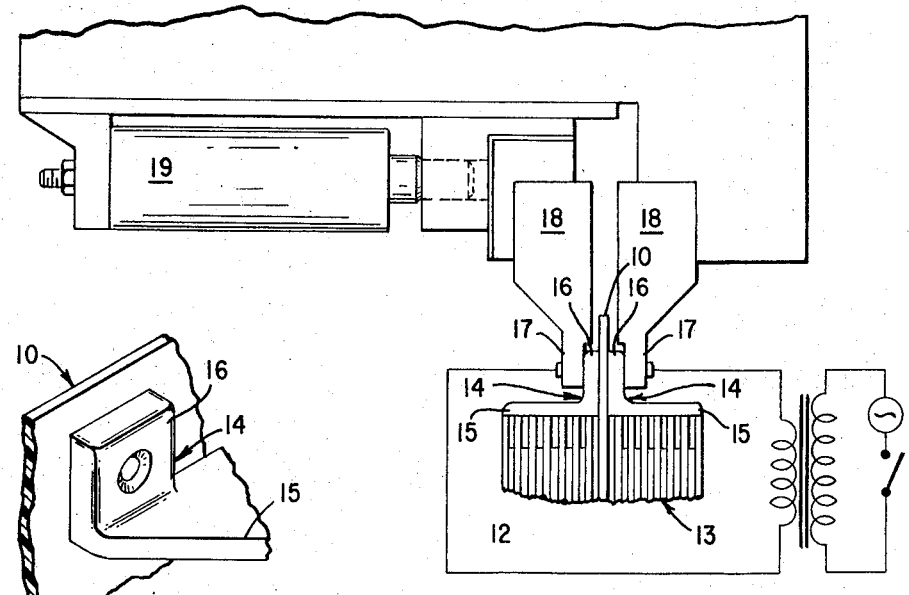
FIG. 1 is a fragmentary sectional view in perspective of a welded connector lug made according to the invention, showing a frusto-conical indentation produced by the extruder- electrode described herein.
FIG. 2 is a schematic representation showing an extruder-electrode die electrically connected to welding apparatus for producing the welded connector lug of FIG. 1.

As previously explained, a storage battery with multiple cells requires an intercell connector which extends through the partition or wall between adjacent cells. The wall material will normally be hard rubber or a plastic material such as polyethylene or polypropylene. A portion of such wall is designated by reference number 10 throughout the drawings with the preformed hole or aperture for the connector designated by reference number 11. As shown in FIG. 2, plate stacks 12 and 13 are provided with separators (not shown) and connector elements 14.

The connector elements 14 comprise connector straps 15 and upwardly extending connector lug portions 16 having flat surfaces. The intercell connector straps 15 are preferably made of a material similar to the positive and negative plates and are predominantly lead or a lead alloy. The positive plates of the stack 12 are connected in electrical series to the negative plates of the stack 13 by welding the connector lugs 14 to each other through the hole 11 in the partition 10 by a procedure to be described hereinafter in greater detail.

The partition walls 10 of the battery casing are prepared for the intercell connector elements 14 by placing the aperture 11 therein, either by molding it in the wall or cutting it in a subsequent operation. In order to prevent discharge of the battery plates in adjacent cells, the partitions must be liquid-tight. The intercell electrical lugs 14 must be sealed to each other in such a manner that electrolyte leakage from one cell to another is prevented and the connection therebetween is mechanically and electrically sound.

Figures 3, 4:
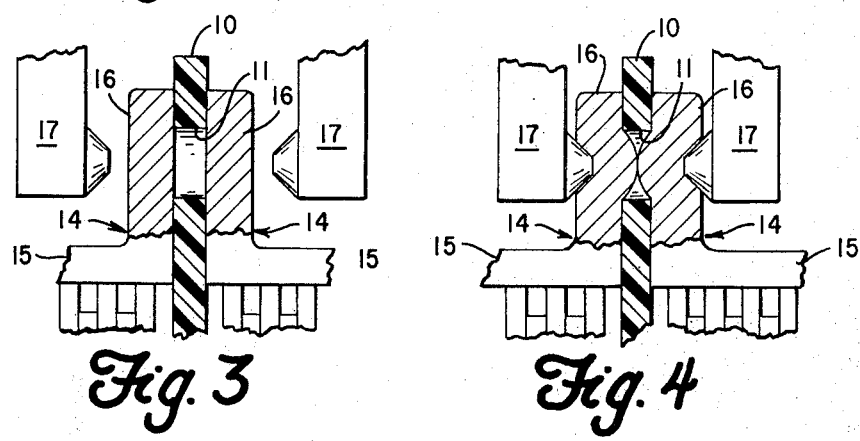
FIG. 3 is a schematic elevational view showing the first step of the method wherein opposed connector lugs are placed over a partition aperture.
FIG. 4 is a schematic elevational view showing the second step of the method wherein the initial high shear force has extruded a portion of each of the connector lugs into the aperture and into contact with one another.

FIGS. 3 to 6 generally depict the basic steps of the invention for producing battery intercell electrical connections. FIG. 3 shows the flat face of battery connector lugs 14 adjacent the aperture 11 of a battery partition wall 10. An extruder-electrode die 17 is shown approaching the connector lugs 21. The tips on the electrodes 22 are, in this preferred embodiment, generally frusto-conical in shape and are placed opposite the hole 11 with their axes coincident with the center of the hole.

FIG. 4 shows the electrodes 17 initially contacting the connector lugs 16. A high initial cold forging force of about 650 to 1,000 pounds is applied to the connector lugs 14, thereby cold forging or extruding portions of the lugs 14 into the aperture 11 of the partition wall 10. In a preferred embodiment where the largest diameter of the frusto-conical electrode is about 0.375 inches, this force results in a shearing load of about 2,700 to 5,000 psi, or a compressive load perpendicular the intercell connector surface of about 6,500 to 10,000 psi. Cold extrusion continues until there is metal-to-metal contact of the opposed lugs 14 as shown in FIG. 4.

Figures 5, 6:
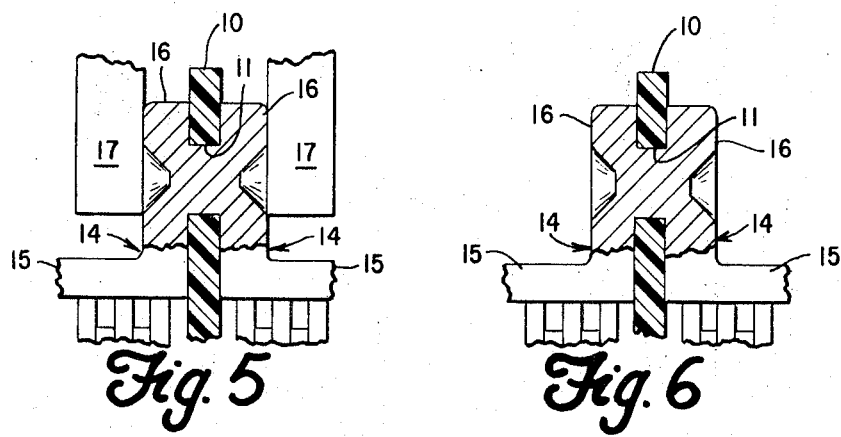
FIG. 5 is a sectional elevational view showing another step of the method wherein the extruded lug portions are welded together and further extruded to fill the aperture.
FIG. 6 is a schematic elevational view showing an intercell through-the-partition battery connector produced according to the method of the invention.

The high initial is then reduced to a lower secondary force, preferably to about 300 pounds (3,000 psi compressive load). After the lower secondary shear force is applied, an electrical welding current is applied through the extruded lug portions 14, with an apparatus schematically shown in FIG. 2. Upslope controllers are used for the welding current, that is, the welding current is increased as the metal-to-metal contact increases due to further contact of the two lugs within the partition. FIG. 5 shows the extruded portions fused together and further extruded to fill the aperture 11.

Upon reaching the nearly completed configuration of FIG. 5, welding current is stopped and the joint is allowed to cool under the applied secondary force, or under a slightly increased force, as from 500 to 700 pounds, (5,000 to 7,000 psi compressive load). Upon cooling, the force is released, the electrodes 17 backed away and removed, and the battery box and its connected cells is ready for a subsequent manufacturing step. A cross-section of the completed joint is shown in FIG. 6.

As an example of the cycle of operation of this method, successful cell connections have been produced following the below listed sequence, using a 60 Hz welding device adjusted such that the maximum welding current was 4,300–4,500 amps:

| STEP | CYCLES | TIME IN SECONDS |
| --- | --- | --- |
| Cold forging force of 1000 lbs. applied | 40 | 0.67 |
| Welding force of 500 lbs. applied and upslope current increased | 5 | 0.08 |
| Full welding current applied | 30 | 0.50 |
| Cooling force of 500 lbs. held with current off | 30 | 0.50 |
| TOTAL | 105 | 1.75 |

From the above, it can be seen that the entire method can be completed in less then two seconds, once the electrodes are in the forging position of FIG. 3. Using a machine programmed as above, with multiple ganged units for making the connection through each partition in a multiple cell battery, batteries have been processed at a rate of ten per minute, or one per six seconds. The increased time of source is required to place the battery in position within the machine, etc. A portion of the machine is schematically shown in FIG. 2 and includes movable jaws 18 which carry the forging and welding electrodes 17 and a reciprocating cylinder 19 of a suitable size for reciprocating the jaws 18. The electrical welding current is schematically shown in FIG. 2 and controls for effecting the sequence of events in the process of this invention will be apparent to those skilled in the art. The specific details of the machine are not considered to be a part of this invention.

It should be emphasized that reduction of the initially applied shear force during the welding cycle is essential. If the high applied shear force is maintained during the welding cycle, molten lead will be squirted from the welding joint and an imperfect joint can result. While the prior art shows the use of a clamping and shielding member separate from the forming and welding equipment, a clamping member makes the forming and welding process complicated and more time consuming and makes the equipment unwieldy.

Variations in the time sequence described above may be necessary to adopt the method to various types of connections, depending upon the volume of lead to be displaced into the hole 11 in the wall 10. Such adoptions or adjustments will be apparent to those skilled in the art. Other variations can be made without departing from the spirit and scope of the appended claims.

I claim:

1. A method for making a battery intercell electrical connection through an aperture in a battery partition wall which comprises the steps of (1) placing opposed conductive connector elements adjacent the aperture on each side of said partition wall, said connector elements having a flat face adjacent said aperture, (2) cold forging said connector elements by applying thereto an initial high compressive load to drive portions of said flat face into said aperture to provide metal-to-metal contact of said connector element faces within said aperture, (3) reducing said compressive load to a secondary loading of less than half of said initial high load (4) passing an electric welding current through said contacting connector elements through said aperture, and increasing said welding current as said metal-to-metal contact increases due to continued deformation of said connector elements, until said connector elements fill said aperture in said partition wall, (5) stopping said electric current to cool said welded metal while maintaining secondary compressive load on said elements, and (6) releasing said elements from said secondary compressive load.

2. A method for making a battery intercell electrical connection through an aperture in a battery partition wall which comprises the steps of (1) placing opposed conductive connector elements adjacent the aperture on each side of said partition wall, said connector elements having a flat face adjacent said aperture, (2) cold forging said connector elements by engaging said elements exteriorly with a pair of opposed converging extruder die plates having projecting tips thereon, said plated applying to said connector elements an initial high clamping force sufficient to drive portions of said flat face into said aperture to provide metal-to-metal contact of said connector element faces within said aperture, (3) reducing said clamping force to a secondary low value less than half of said initial value and passing an electric welding current through said projecting tips and through said contacting connector elements until said connector elements fill said aperture in said partition wall, (4) stopping said electric current to cool said welded metal while maintaining clamping force on said elements, and (5) releasing said elements from said clamping force.

3. The method of claim 2 wherein said electric welding current is initially applied at a low amperage and is increased throughout the welding sequence as metal-to-metal contact of the element increases.

4. A method of making a battery intercell electrical connection through an aperture in a battery partition wall, as recited in claim 2, wherein said current passing step further includes increasing said welding current as said metal-to-metal contact increases due to continued deformation of said connector elements.

5. A method of making a battery intercell electrical connection through an opening in a battery partition wall, as recited in claim 2, wherein said initial high clamping force is between 6,500 and 10,000 psi, and said secondary low value is about 3,000 psi.

* * * * *

UNITED STATES PATENT OFFICE
CERTIFICATE OF CORRECTION

Patent No. 3,793,086         Dated February 19, 1974

Inventor(s) John P. Badger

It is certified that error appears in the above-identified patent and that said Letters Patent are hereby corrected as shown below:

Abstract, line 13, "fills" should be --fill--.
Column 1, line 48, "of" should be --or--.
Column 2, line 10, after "intercell", insert --electrical--.
Column 3, line 31, after "initial", insert --force--.
Column 4, line 2, "then" should be --than--.
Column 4, line 8, "source" should be --course--.
Column 5, line 1, "plated" should be --plates--.

Signed and sealed this 9th day of July 1974.

(SEAL)
Attest:

McCOY M. GIBSON, JR.
Attesting Officer

C. MARSHALL DANN
Commissioner of Patents